M. D. AVILLAR.
PROCESS OF FORMING SPRING PACKING RINGS.
APPLICATION FILED JAN. 12, 1920.

1,359,857. Patented Nov. 23, 1920.

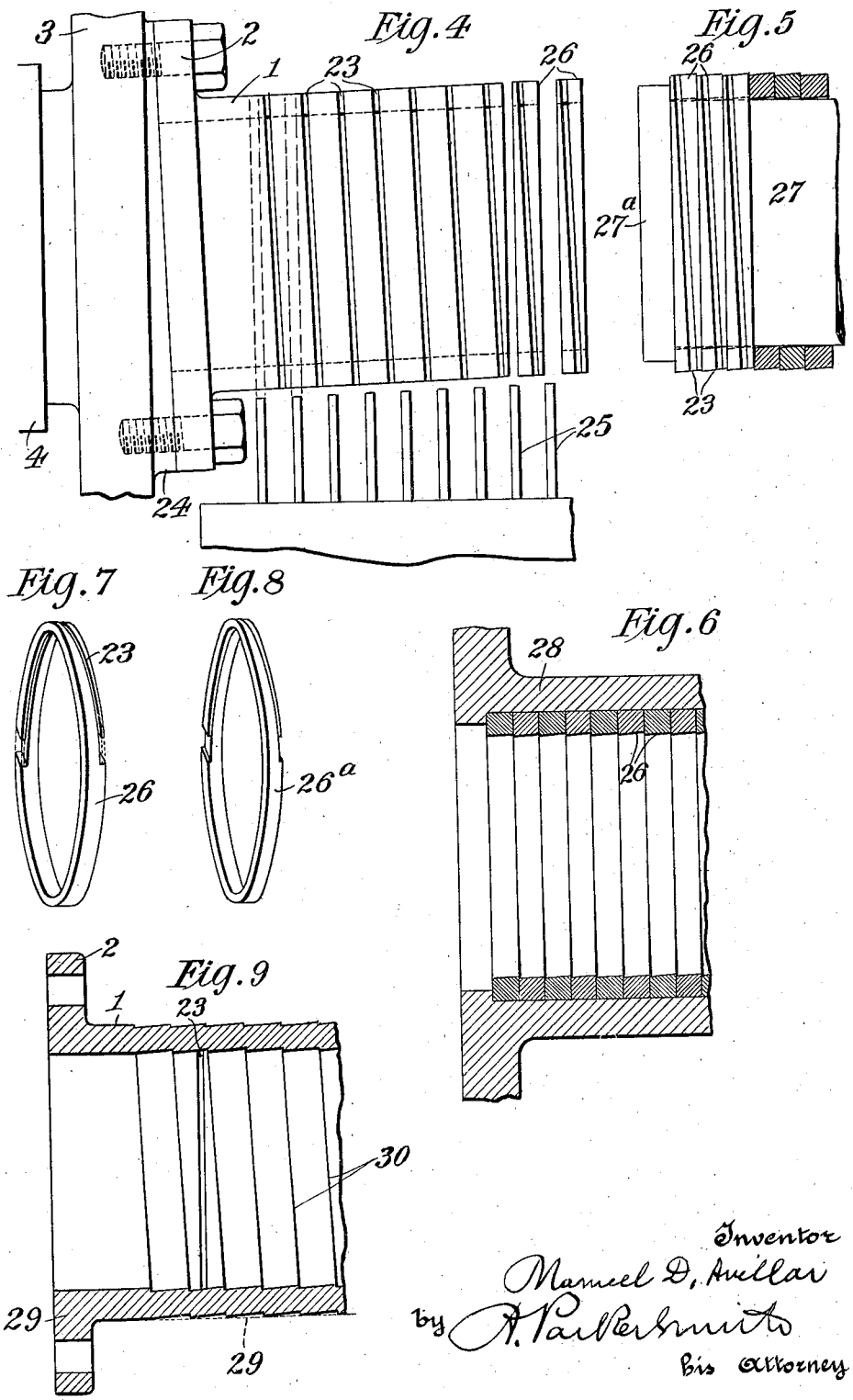

UNITED STATES PATENT OFFICE.

MANUEL D. AVILLAR, OF NEW YORK, N. Y.

PROCESS OF FORMING SPRING PACKING-RINGS.

1,359,857.      Specification of Letters Patent.    Patented Nov. 23, 1920.

Application filed January 12, 1920. Serial No. 351,075.

*To all whom it may concern:*

Be it known that I, MANUEL D. AVILLAR, a citizen of the United States of America, residing at New York city, county of New York, State of New York, have invented certain new and useful Improvements in Processes of Forming Spring Packing-Rings, of which the following is a specification.

My invention relates to the more economical production of a certain standard form of packing ring used on the pistons of gas engines and similar structures, and comprises a method or process by which a considerable number of such rings of uniform character may be produced, practically simultaneously, in one series of operations, using one machine tool or set of machine tools. The type of packing ring referred to is that described in my pending application, Serial No. 339811 filed November 22, 1919, for an improved apparatus for making such rings from separate die-cast blanks, and my present invention comprises a modification of the mode of procedure described in my said prior application, in that it embodies a process for making a considerable number of such rings from a single cylinder, or pot casting, of proper dimensions.

The rings to be produced are divided, or split, so as to have two free ends which overlap one another for a considerable portion of the ring circumference, and which ends are correspondingly but oppositely tapered. One face of each tapering end is a prolongation of the plane of that face or side of the ring, and consequently the other and opposite faces of the two tapering ends lie in a plane oblique to the ring faces or sides. In other words, the ring is cut through from one face to the other, by a substantially diagonal slot so as to form overlapping, oppositely tapering, free ends. Heretofore these rings have been made by progressively cutting sections from a proper cylinder, or pot casting and then cutting the necessary diagonal slot in each ring by a separate operation. The main problem in the way of the more rapid and economical multiple production of these rings has been the supposed impossibility of simultaneously cutting all these diagonal slots at one operation on the pot casting. My invention solves this problem and renders it possible to simultaneously make a plurality of these rings, by one series of operations on a proper pot casting. This result is obtained by reversing the order of steps heretofore employed, *i. e.*, by first cutting a series of parallel slots in the cylinder in planes perpendicular to its axis, which can be done in any lathe or milling machine or similar machine tool, and then rechucking the cylinder or pot casting to give such slots the desired inclination to its plane of rotation and thereupon dividing it up into separate rings by cutting it at a plurality of equi-spaced points in the plane of its rotation when chucked in this inclined position.

The rings so cut off from the pot casting will each have the proper slot extending from or near, one face to or nearly to, the other face, and inclined thereto at the desired angle, and, by removing short sections from each face in the usual way, there is opportunity to close the ring upon itself by springing it down to a lesser diameter, in the usual way, thus to form a structure which will tend to expand radially in every direction and form the desired piston packing ring.

Obviously, the general process or mode of procedure briefly outlined above for making such packing rings may be carried out by various forms of apparatus, but the best form of apparatus and mode of use thereof for carrying out my invention at present known to me are illustrated in the accompanying two sheets of drawings, in which—

Figure 1. is a plan view and partial section of one form of apparatus adapted to cut the required parallel slots at one operation, parts being broken away and the pot casting being shown in position after being operated on.

Fig. 2. is a side elevation and partial section of the same apparatus, parts being broken away.

Fig. 3. is a cross section on line 3—3 of Fig. 1.

Fig. 4. is a diagrammatic plan view of an apparatus for cutting up the slotted pot casting into a plurality of rings, in each of which rings one of the slots shall occupy the desired diagonal position, parts being broken away.

Fig. 5. is a detail view, partly in section, of a plurality of such rings assembled on a mandrel for grinding their exterior cylindrical surfaces to form a right cylindrical surface.

Fig. 6. is a sectional view of such rings assembled in a cylindrical holder or chuck for similarly grinding their interior cylindrical surfaces.

Fig. 7 is a perspective view of a ring after its surfaces have been ground as above described.

Fig. 8 is a similar view of the ring after its tapering, overlapping ends have been sprung together, and Fig. 9 is a detail in section of a special form of pot casting from which may be cut rings which can be finished up with less grinding.

Figure 1:
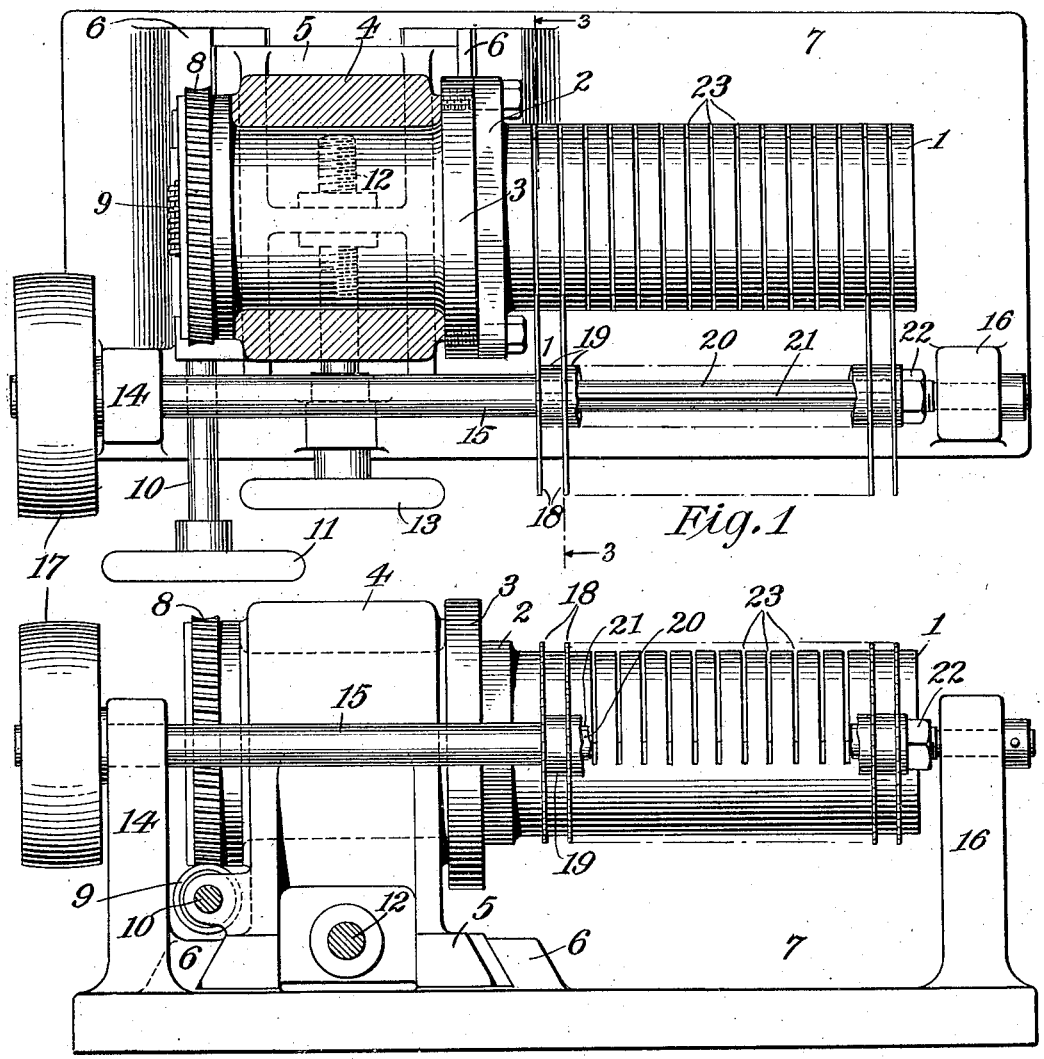

Throughout the drawings like reference characters indicate like parts: 1 is a cylinder or pot casting of the proper metal which represents the product of the first step of my process. This may be formed with a flange 2, by which it may be conveniently bolted to the rotating head 3, of a special machine, or to the face plate of a lathe. This flange may, however, be dispensed with. 4, is the housing in which head 3 is journaled. This is carried by a dovetailed base or slide 5, set between transverse guides, 6, 6, formed on bed plate 7. Head 3, has a worm gear 8, formed on it which meshes with worm 9, on shaft 10, journaled on the base 5. Said shaft carries a hand wheel 11. Housing 4, and slide 5 can be moved transversely of the bed plate 7, by feed screw 12, controlled by hand wheel 13. Cutter shaft 15, having a reduced section 20, provided with feather 21, and a threaded end equipped with nut 22, is journaled in housings 14, 16, on the bed plate 7, and carries driving pulley 17. A series of rotary cutters 18, each provided with spacing hubs 19, are strung on the reduced portion 20 of shaft 15, and these, by means of nut 22, are clamped against the shoulder formed by the larger section of the shaft, the feather 21 engaging slots in the hubs to further prevent their rotation on the shaft.

The above described apparatus furnishes a convenient means for cutting simultaneously a plurality of parallel slots 23, in the pot casting 1, by rotating the cutters 18, forcing them against the pot by turning hand wheel 13, until they have cut through the cylindrical wall of the pot, and then slowly rotating the pot by turning hand wheel 11.

The slots 23 preferably extend about half way around the pot 1, and the thickness of the stock left between them should be approximately the thickness of the completed rings desired. To cut up the slotted cylinder 1, into separate rings, it is rechucked on head 3 at an angle by interposing wedge 34, as indicated in Fig. 4, and then rotating the pot against a gang of cutting tools 25, which are slowly fed in toward the cylinder by any usual feed apparatus, not shown. This will cut up the pot casting 1, into a plurality of separate rings, tools 25 cutting the pot along planes such as are indicated by the broken lines in Fig. 4, which are inclined to the planes of slots 23 by angles equal to the angle of taper of the ends of the rings to be formed. The rings so formed by the above described operations are continuous, each one having a slot 23, which extends diagonally from near one ring face nearly to the other. These rings have outer and inner cylindrical surfaces or edges but these are slightly inclined to the axes of the rings. To reduce them to right cylindrical surfaces the rings are first strung on a mandrel 27, and clamped against mandrel head 27ª, as shown in Fig. 5, by any convenient means not shown, and their exterior, separate, cylindrical surfaces ground down to coincide with a single, continuous cylindrical surface such as indicated in Fig. 6. They are then chucked in a cylinder 28, and their interior, separate, cylindrical surfaces also ground down to a single, continuous, cylindrical surface. Next they are cut in planes parallel to their axes, from the ends of the diagonal slots 23, to the nearest surface, and again similarly cut at short distances from the ends of the slot 23. This produces the split ring 26 shown in Fig. 7, with oppositely tapering, overlapping free ends, separated by slot 23. To bring the opposing surfaces of these ends in contact the ring is properly heat treated as by snapping the tapered ends into a position the reverse of that shown in Fig. 7, subjecting the entire ring to an annealing temperature, and then snapping the ends back into the position shown in Fig. 8, this final operation resulting in the completed packing ring 26ª shown in Fig. 8 which may be further polished and ground or cut to the exact size desired if desired.

Figure 2:
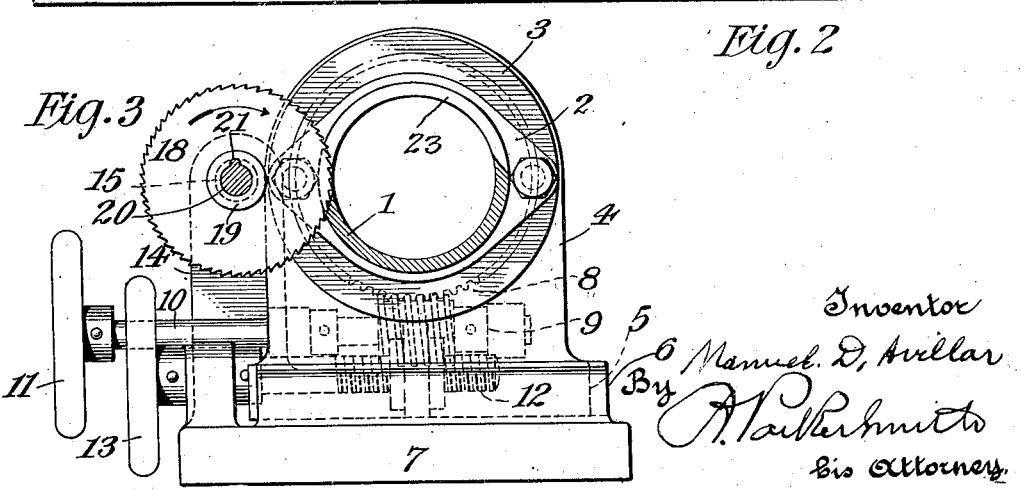
Figure 3:
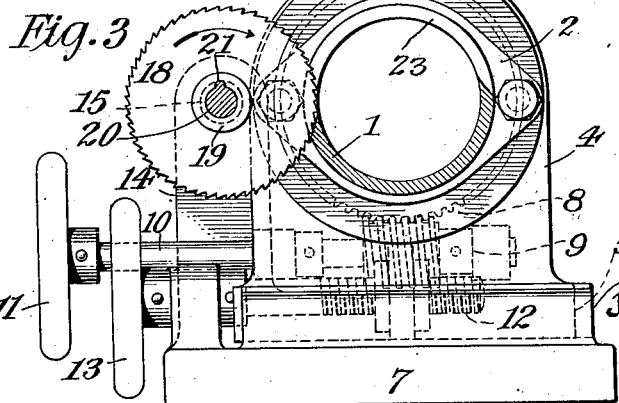

It is evident that to carry out the above described process the walls of pot 1 must be somewhat thicker than the radial thickness of the completed rings, and that the surplus material ground off in the operations indicated in Figs. 5 and 6 is wasted. To save this and the time and power consumed in grinding it off, the pot 1, may be cast with the approximate configuration of a collection of the completed rings assembled with their centers in the axis of the pot, the ring sections being stepped so that while corners of their cross sections are in the same straight line, as 29, Fig. 9, which is parallel to the axis of the pot and to the line of ring section centers, the faces of the several ring configurations are inclined to planes perpendicular to the pot axis by angles equal to the angle of taper of the ends of the rings to be formed. The parallel slots 23, may then be cut, one in each ring configuration, by the apparatus shown in Figs. 1, 2 and 3, the planes of these slots being in the plane of rotation of the pot when chucked as in Figs. 1 and 2. The slotted pot is then chucked at an angle as shown in Fig. 4 and before explained, and cut up into separate rings along the planes 30, of the meeting surfaces of the adjacent ring configurations. The rings so formed will have substantially right cylindrical edges and need only the cutting out of the sections to form the tapering ends as indicated in Fig. 7, and the final polishing and heat treatment.

It is evident that the cutters 18, which form the slots 23, must be spaced a little farther apart than the cutters 25, which sever the rings. The distance between the center plane of any two adjacent cutters 18, bears the proportion to the distance between the center planes of any two adjacent cutters 25, that the hypotenuse of a right angled triangle whose base angle is the angle of taper of the finished ring ends, bears to the base of such triangle. In other words the ratio between these spacings equals the versed-cosine of said angle. Consequently, if the widths of cutters 18 and 25 are the same, the former should be spaced apart a distance equal to the product of the thickness of the completed ring multiplied by the versed-cosine of the angle of taper of the ring ends, while the cutters 25, would be spaced apart by distances equal to the thickness of the completed rings. It is understood, of course, that the dimensions of the rings may ultimately be further reduced by final grinding and polishing to make their inner and outer edges absolutely true, right cylindrical surfaces.

It would be advisable to have the cutters 25 extend progressively nearer the pot, from left to right of Fig. 4, when the latter is in the position farthest away from said cutters, as there shown, so that the end ring will be completely severed from the rest of the pot cylinder, before the next ring is severed, and so on down the line to the left until the last ring nearest flange 21 is cut off, as otherwise a section of the pot comprising several partly connected rings might be cut off, and this would have to be rechucked to complete the operation, or said rings be sawed apart.

It is evident also that other forms of apparatus, such for instance as are shown in my above recited prior application, could be used to carry out the process here described, that the pot 1, might be made and used without flange 2, and that other variations in the details of procedure here described might be adopted without departing from the principle of my invention which is independent of the particular apparatus employed to carry out the novel process described.

Having described my invention I claim:

1. The process of forming in one series of operations a plurality of uniform, spring packing rings having oppositely tapered, overlapping ends, which comprises the following steps: first, forming a hollow cylinder of suitable metal of proper diameter and of a thickness of wall slightly greater than the radial thickness of the desired rings; second, cutting a series of parallel slots through a portion of such cylinder's wall in planes at right angles to its axis and equispaced apart a distance approximating the thickness of the desired rings when completed; third, cutting said cylinder into a plurality of rings along planes equi-spaced between the beforementioned parallel slots and inclined to the planes thereof at angles equal to the angle of taper of the overlapping ends of the desired completed rings; fourth, cutting out short sections of the material between the surfaces of the rings so formed and the end portions of the above mentioned slots therein; fifth, truing up the cylindrical surfaces forming the inner and outer edges of these rings to form them into right cylindrical surfaces.

2. The process of forming in one series of operations a plurality of uniform, spring packing rings each having oppositely, and equally tapered, overlapping ends, which comprises the following steps: first, forming a hollow cylinder of suitable metal of slightly greater external diameter, and slightly less internal diameter than the desired completed rings; second, cutting a series of parallel slots through a portion of the wall of such cylinder in planes equispaced apart a distance equal to the product of the versed-cosine of the angle of taper of the ring ends, into the sum of the thickness of a completed ring and the width of the cut to be afterward made in severing each ring from the cylinder; third forming said cylinder into the desired plurality of rings by cutting it across along planes equi-spaced between the above mentioned parallel slots and inclined to the planes thereof by angles equal to the angle of the desired taper of the overlapping ends of the completed rings; fourth, removing short sections of material by cutting each ring, in planes substantially parallel to its axis, from each end of the slot therein to the nearest face of the ring, and similarly cutting through to the slot at points short distances from each end of said slot; fifth, truing up the cylindrical surfaces forming the inner and outer edges of these rings to form them into right cylindrical surfaces.

3. The process of forming in one series of operations a plurality of uniform, spring packing rings having oppositely tapered, overlapping ends, which comprises the following steps: first, casting a hollow cylinder of the proper metal the wall of which shall have the configuration of a series of the desired rings, each of slightly enlarged cross section, assembled with their centers coinciding with the axis of the cylinder but with their faces inclined to a plane perpendicular to said axis by an angle equal to the angle of taper of the ends of the desired completed rings; second, cutting a series of parallel slots in said cylinder, one in each ring configuration, in planes at right angles to the axis of the cylinder, said slots extending from a point near one surface of each ring configuration to a point equally distant from the other surface; third, dividing the cylinder up into rings by cutting it along the meeting surfaces of each two adjacent ring configurations; fourth, removing short sections from each ring by cutting it, in planes substantially parallel to its axis, from each end of the above described slot to the nearest face of the ring and similarly cutting it through to the slot at points short distances from each end of said slot.

MANUEL D. AVILLAR.

Witnesses:
 JAMES F. DAVIS,
 EDGAR WILLIAMS.